United States Patent [19]

Tanaka

[11] Patent Number: 4,591,989

[45] Date of Patent: May 27, 1986

[54] SYSTEM FOR DISPLAYING TOOL PARAMETERS OF TOOLS UTILIZED IN A MACHINING PROCESS

[75] Inventor: Hitoshi Tanaka, Aichi, Japan

[73] Assignee: Mitsubishi Denki Kabushiki Kaisha, Tokyo, Japan

[21] Appl. No.: 471,614

[22] Filed: Mar. 3, 1983

[30] Foreign Application Priority Data

Mar. 4, 1982 [JP] Japan ................... 57-34451

[51] Int. Cl.⁴ ............... G06F 15/46; G05B 19/18
[52] U.S. Cl. .................... 364/474; 364/171; 364/188
[58] Field of Search .............. 364/167, 171, 188–189, 364/191–192, 194, 474–475; 318/567–569; 408/6, 8

[56] References Cited

U.S. PATENT DOCUMENTS

| | | | |
|---|---|---|---|
| 3,817,647 | 6/1974 | Lemelson | 408/8 |
| 4,209,847 | 6/1980 | Noda et al. | 364/474 X |
| 4,314,330 | 2/1982 | Slawson | 364/192 |
| 4,370,705 | 1/1983 | Imazeki et al. | 364/167 X |
| 4,390,953 | 6/1983 | Johnstone | 364/474 |
| 4,415,965 | 11/1983 | Imazeki et al. | 364/167 X |
| 4,428,055 | 1/1984 | Kelley et al. | 364/474 |

FOREIGN PATENT DOCUMENTS 2054909A 2/1981 United Kingdom ............. 364/171

Primary Examiner—Gary V. Harkcom
Attorney, Agent, or Firm—Sughrue, Mion, Zinn, Macpeak and Seas

[57] ABSTRACT

A numerically controlled machining system which stores in a memory, a machining program having machining pattern commands for specifying machining patterns, tool commands for specifying tools, and positional information commands for specifying positional information for the tools. A selecting device selects only the tool commands from the stored machining program, and displays parameters regarding the tools selected by the selecting device. The display can display a list of tools along with the parameters thereof so that the operator can locate the tools with utmost ease for tool preparation and attachment.

4 Claims, 17 Drawing Figures

---

WORK NO 1

| PKNO | TOOL NAME | NOMINAL DIAMETER | TOOL DIAMETER | LENGTH | LENGTH COMPENSATION | TOOL LIFE |
|---|---|---|---|---|---|---|
| 2-0 | FACE MILLING | 100.0A | 100.000 | 156.785 | 0.000 | 90' |
| 3-0 | FACE MILLING | 100.0B | 100.000 | 143.513 | 0.200 | 90' |
| 4-0 | SPOT DRILLING | 12.0 | * | 201.448 | 0.800 | 90' |
| 4-1 | DRILLING | 10.0 | * | 194.363 | 0.500 | 90' |
| 5-1 | DRILLING | 10.0A | * | 195.511 | 0.000 | 90' |
| 6-0 | END MILLING | 13.0A | 13.200 | 147.754 | 0.300 | 90' |

FIG. 8

WORK NŌ 1 　　　　　　　　　　　　　　　　　　　　　　　　　　　　　　26

| PKNO | TOOL NAME | NOMINAL DIAMETER | TOOL DIAMETER | LENGTH | LENGTH COMPEN-SATION | TOOL LIFE |
|---|---|---|---|---|---|---|
| 2-0 | FACE MILLING | 100.0A | 0.000 | 0.000 | 0.000 | 0' |
| 3-0 | FACE MILLING | 100.0B | 0.000 | 0.000 | 0.000 | 0' |
| 4-0 | SPOT DRILLING | 12.0 | 0.000 | 0.000 | 0.000 | 0' |
| 4-1 | DRILLING | 10.0 | 0.000 | 0.000 | 0.000 | 0' |
| 5-1 | DRILLING | 10.0A | 0.000 | 0.000 | 0.000 | 0' |
| 6-0 | END MILLING | 13.0A | 0.000 | 0.000 | 0.000 | 0' |

FIG. 9

| TOOL 1 $a_1$ | POCKET NO. |
| | TOOL NAME |
| | NOMINAL DIAMETER |
| | LENGTH |
| | TOOL DIAMETER |
| | ⋮ |
| | ETC |
| | ⋮ |

TOOL 2 $a_2$

TOOL 3 $a_3$

FIG. 10

WORK NO. 1

| PKNO | TOOL NAME | NOMINAL DIAMETER | TOOL DIAMETER | LENGTH | LENGTH COMPEN- SATION | TOOL LIFE |
|---|---|---|---|---|---|---|
| 2-0 | FACE MILLING | 100.0A | 100.000 | 156.785 | 0.000 | 90' |
| 3-0 | FACE MILLING | 100.0B | 100.000 | 143.513 | 0.200 | 90' |
| 4-0 | SPOT DRILLING | 12.0 | * | 201.448 | 0.800 | 90' |
| 4-1 | DRILLING | 10.0 | * | 194.363 | 0.500 | 90' |
| 5-1 | DRILLING | 10.0A | * | 195.511 | 0.000 | 90' |
| 6-0 | END MILLING | 13.0A | 13.200 | 147.754 | 0.300 | 90' |

SYSTEM FOR DISPLAYING TOOL PARAMETERS OF TOOLS UTILIZED IN A MACHINING PROCESS

BACKGROUND OF THE INVENTION

1. Field of the Invention

The present invention relates to a numerically controlled machining system (hereinafter referred to as an "NC machining system") in which a machine tool is controlled by a numerical control unit (hereinafter referred to as an "NC unit") to machine a workpiece, and more particularly to such an NC machining system having an improved system for displaying data regarding tools used.

2. Description of the Prior Art

Numerically controlled machine tools (hereinafter referred to as an "NC machine tools") are controlled by NC units which receive numerical information specifying the position of a tool with respect to a workpiece, performs an arithmetic operation based on the numerical information, and controls the tool to machine the workpiece on the basis of the results of this arithmetic operation. NC machine tools can machine workpieces into complex shapes easily with high presision at an increased rate of production.

The NC machine tool is generally constructed as shown in FIG. 1 of the accompanying drawings. The NC machine tool basically comprises an NC unit 20 for processing, through arithmetic operations, numerical information commands supplied via an input terminal 10 from an external source, and a machining unit 30 controlled by the results of the arithmetic operation effected by the NC unit 20, for machining a workpiece. The NC unit 20 is composed of an input device 21 for receiving input commands from the external source, an arithmetic unit 22 for performing arithmetic operations upon the commands from the input device 21, a memory 23 for storing the results of the arithmetic operations carried out by the arithmetic unit 22, the commands from the input device 21, and other data, a control device 24 for controlling the arithmetic operations in the arithmetic unit 22, an output device 25 for delivering the results of the arithmetic operations from the arithmetic unit 22 as outputs from the NC unit 20, and a display device 26 for displaying the contents of the memory 23 and the input information given to the input device 21. Some NC units additionally include a keyboard for inputting information into the memory 23.

The machining unit 30 has a tool 31 supported by a tool holder 32 secured to a chuck on a spindle 33 that can be rotated by a spindle motor 34 driven by signals issued from the output device 25 of the NC unit 20. The machining unit 30 includes a table 35 for securing thereon a workpiece 40 with a jig or a suitable fixture. The table 35 is movable in the direction of the X-axis by a ball screw 36 driven by an X-axis feed motor 38 through a gear box 37. The X-axis feed motor 38 is drivable under the control of signals delivered from the output device 25 of the NC unit 20. The table 35 is also movable in the directions of Y- and Z-axes by mechanisms (not shown) which are identical with the above X-axis drive mechanism and driven by signals from the NC unit 20.

When a counterbored hole 41 is to be formed in the workpiece 40 as shown in FIG. 2 by the NC machine tool of FIG. 1, the workpiece 40 is machined with a rough face mill, a fine face mill, a spot drill, a drill, and an end mill, sequentially in the order named.

This sequential machining operation will be described in more detail as illustrated in FIG. 3. As shown in FIG. 3(a), a face mill 50 is used to mill the workpiece 40 for forming a roughly flat surface, a machining step hereinafter called "rough face milling." Then, a face mill 51 which is capable of finer machining than the face mill 50 is employed to cut a fine, flatter surface; the surface formed by fine face milling being illustrated in FIG. 3(c). Thereafter, a centering hole is cut in the milled surface of the workpiece 40 by a spot drill 52, as shown in FIG. 3(d). This machining step is called "spot drilling" in which a bore is formed in the workpiece 40 by a drill 53, as shown in FIG. 3(e). Then, an end mill 54 is used to enlarge the bore at its end with a square shoulder at the enlarged end, thereby forming a counterbored hole 41, as illustrated in FIG. 3(f). The final machining step is called "end milling."

FIG. 4 shows the fundamental construction of a machining program enabling the NC machine tool to effect the counterboring operation as described in FIGS. 2 and 3. The machining program is composed of machining pattern specifying blocks, tool specifying blocks, and positional information specifying blocks. Each machining pattern specifying block serves to specify a machining pattern such, for example, as counterboring, threading, or boring. As is apparent from the counterboring operation shown in FIG. 3, a plurality of tool specifying blocks and a plurality of positional information specifying blocks are normally required. Each tool specifying block is used for specifying a tool for a particular machining operation, and the following positional information specifying block serves to specify positional information for machining with the specified tool. The machining program is written on a coding sheet outside the NC unit 20 and punched onto a paper tape. There is provided a means for reading the punched program and loading the same into the NC unit through the input terminal 10 (FIG. 1) to effect the machining operation, or a means for fully storing the punched program into the memory 23 (FIG. 1) and reading the program out of the memory to perform the machining operation. Alternatively, an NC unit with provision for creating a machining program may be employed, and a machining program may be stored directly in the memory through a control panel of the NC unit such as a keyboard, the stored program being successively read for carrying out the machining operation.

A method of creating a machining program will be described in detail with reference to FIG. 5. FIG. 5(a) is a flowchart for preparing a machining program, and FIG. 5(b) is illustrative of the prepared machining program. For creating a machining program, a machining pattern such as a counterbore as shown in FIG. 2 is given as a command. Then, a command is prepared for returning the workpiece supporting table in the NC machine tool to a reference point along the X-, Y-, and Z-axes. Then, a command for the first tool to be used is prepared, the tool command being normally expressed by a "T" number. For a program for forming the counterbore of FIG. 2, a command is prepared for specifying the rough face mill as shown in FIG. 3(a). The next step is to create a command for moving the tool to a machining starting point. Subsequently, a command for rotating the spindle with the tool mounted thereon, a command for specifying the speed of rotation of the spindle, and a command for specifying the cutting path and machining speed are successively prepared to enable the tool to machine the workpiece to a predetermined shape under these commands. Then, a command for stopping the rotation of the spindle is created. With this stopping command, the machining operation using the specified tool is brought to an end. Thereafter, a command for specifying the next tool is created. In case the counterbored hole as illustrated in FIG. 2 is to be formed, the face mill with higher machining accuracy as shown in FIG. 3(b) is specified by this tool specifying command. Then, the commands 4 through 8 are prepared again to set up the machining mode using the second tool. Machining modes for respective tools used are prepared in the foregoing manner until a desired machining program is completed.

Under the machining program thus prepared, a plurality of tools are employed and mounted on an automatic tool changer provided in the NC machine tool. The automatic tool changer is effective to automatically change tools on the spindle under tool commands. The automatic tool changer has a tool magazine for holding a number of tools, the tool magazine including tool pockets marked with pocket numbers (PK NO) which are the same as tool commands "T". Prior to any machining operation based on a desired machining program such as shown in FIG. 5, the operator is required to place tools required by the program in the tool pockets with the pocket numbers corresponding respectively to the "T" numbers according to the machining program.

One prior tool attachment practice is for the machining program as illustrated in FIG. 5(b) to be all displayed on the display 26 in the NC unit. Where the display 26 is in the form of a cathode-ray tube (CRT), the machining program for forming the counterbore as shown in FIG. 2 is displayed in a pattern as shown in FIG. 6. The CRT 26 displays on its screen all of the machining program including the tool commands T1053, T1054, T1055, T1045, T1044, T1046, and the machining modes using the specified tools. The operator prepares and sets tools with reference to a referance table wherein the T numbers and the tools are listed in 1-to-1 correspondence according to the displayed program. As an example, the reference table enables the operator to identify "T1053" as a "rough face mill".

Since the tools are identified simply as symbols such as T numbers in the displayed program, the operator has to refer to the reference table to select or prepare desired tools, and thus the tool selection procedure is troublesome.

The prior NC machining system is also disadvantageous in that the CRT 26 also displays many numbers and symbols unnecessary for tool selection, and the operator finds it tedious and time-consuming to locate only the "T" numbers in the displayed machining program. Therefore, a long period of time has been needed for preparing the necessary tools. For tool preparation, only tool commands 3 and 8 in the program as shown in FIG. 5 are needed, and other data items expressed in numbers and symbols are unnecessary.

SUMMARY OF THE INVENTION

With the foregoing prior problems in view, it is an object of the present invention to provide an NC machining system allowing tools to be prepared and attached simply and easily in an NC machine tool.

Another object of the present invention is to provide an NC machining system in which tools programmed in a machining program are extracted and displayed as a list.

Still another object of the present invention is to provide an NC machining system in which the tools used and the parameters thereof are displayed as a list, and data items for the tool parameters can be entered as inputs through a keyboard.

A still further object of the present invention is to provide an NC machining system having an NC unit capable of creating machining programs for enabing a display device to display the list of tools required in a prepared machining program.

According to the present invention, a numerically controlled machining system has means for storing in a memory in a machining program having machining pattern commands for specifying machining patterns, tool commands for specifying tools, and positional information commands for specifying positional information for the tools, means for selecting the tool commands from the stored machining program, and means for displaying data items regarding the tools selected by the selecting means, the data items being in the form of a list of the tools along with tool parameters.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a view of a CRT screen which displays a list of tools according to the NC machining system of the invention;

FIG. 9 is a diagram showing the pattern in which data items regarding tool parameters are stored in a memory;

FIG. 10 is a view of a CRT screen displaying a list of tools and parameter data therefor.

DETAILED DESCRIPTION OF THE PREFERRED EMBODIMENTS

Figure 7:
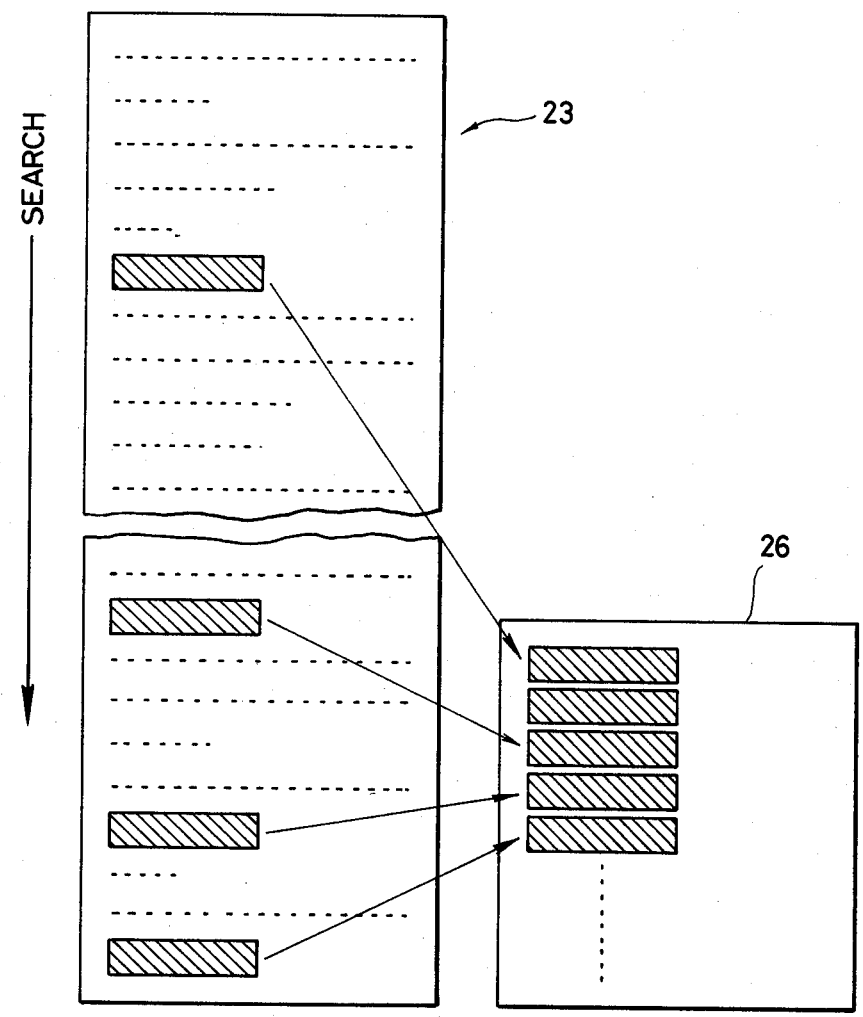
FIG. 7 is a schematic diagram illustrative of an NC machining system according to the present invention.

FIG. 7 schematically illustates an NC machining system in accordance with the present invention. The NC machining system includes means for searching or scanning a machining program stored in a memory 23 all the way from the top to the bottom to pick out only the tool commands (shown hatched) successively out of the program and for copying the tool commands into another area in the memory 23, and means for displaying selected tools on a display 26. In the NC machining system of the invention, at least pocket numbers (PK NO) of the tool machine which correspond to tool commands T, tool names such as "end mill" and "drill" for example, and nominal diameters of the selected tools are displayed as a list on the display 26, as illustrated in FIG. 8 by way of example.

Figure 1:
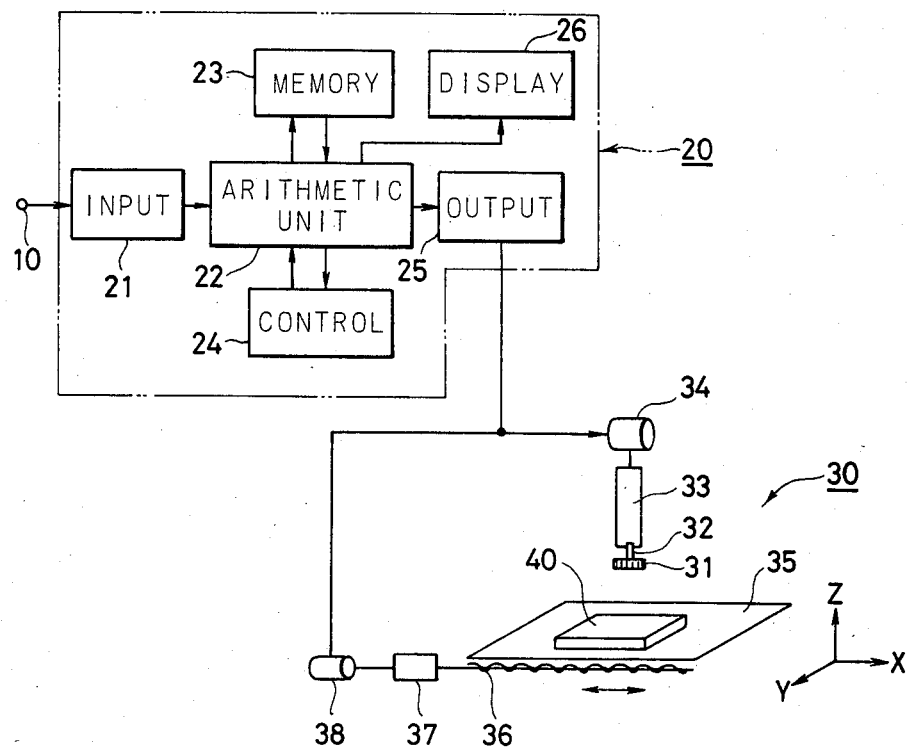
FIG. 1 is a schematic diagram, partly in block form, of a general NC machining system.
Figure 2:
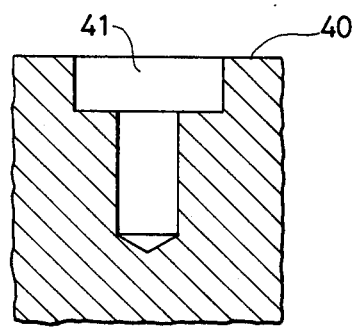
FIG. 2 is a cross sectional view of a workpiece with a counterbored hole formed therein.
Figure 3:
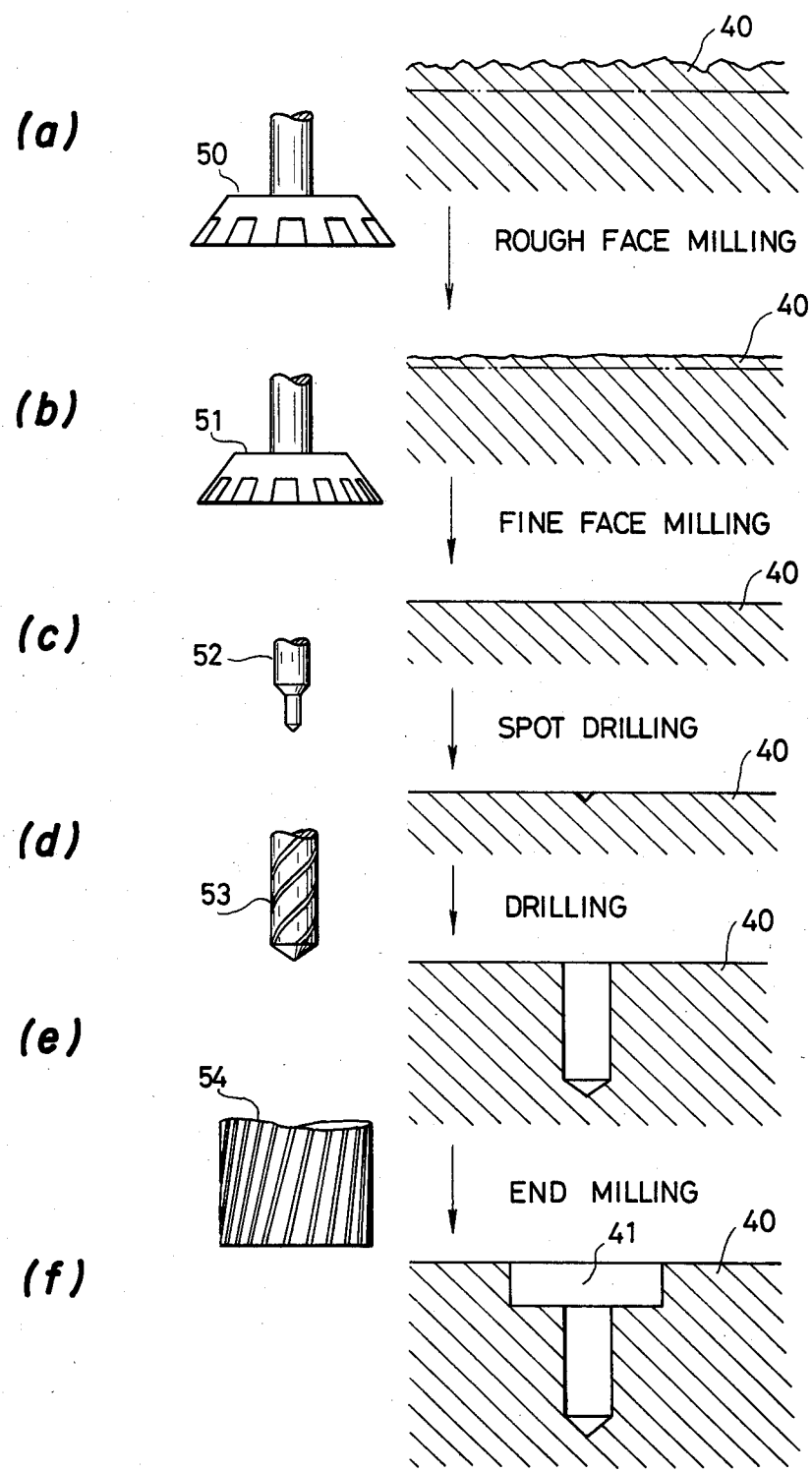
FIG. 3(a) to FIG. 3(f) is a diagram illustrative of the successive steps of forming a counterbored hole as shown in FIG. 2.
Figure 4:
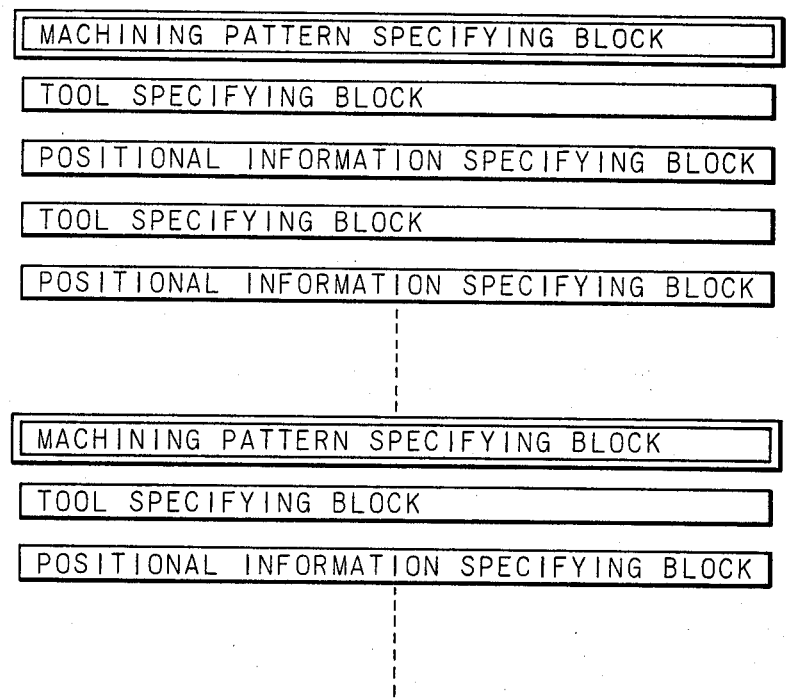
FIG. 4 is a diagram showing the fundamental arrangement of a machining program.
Figure 5:
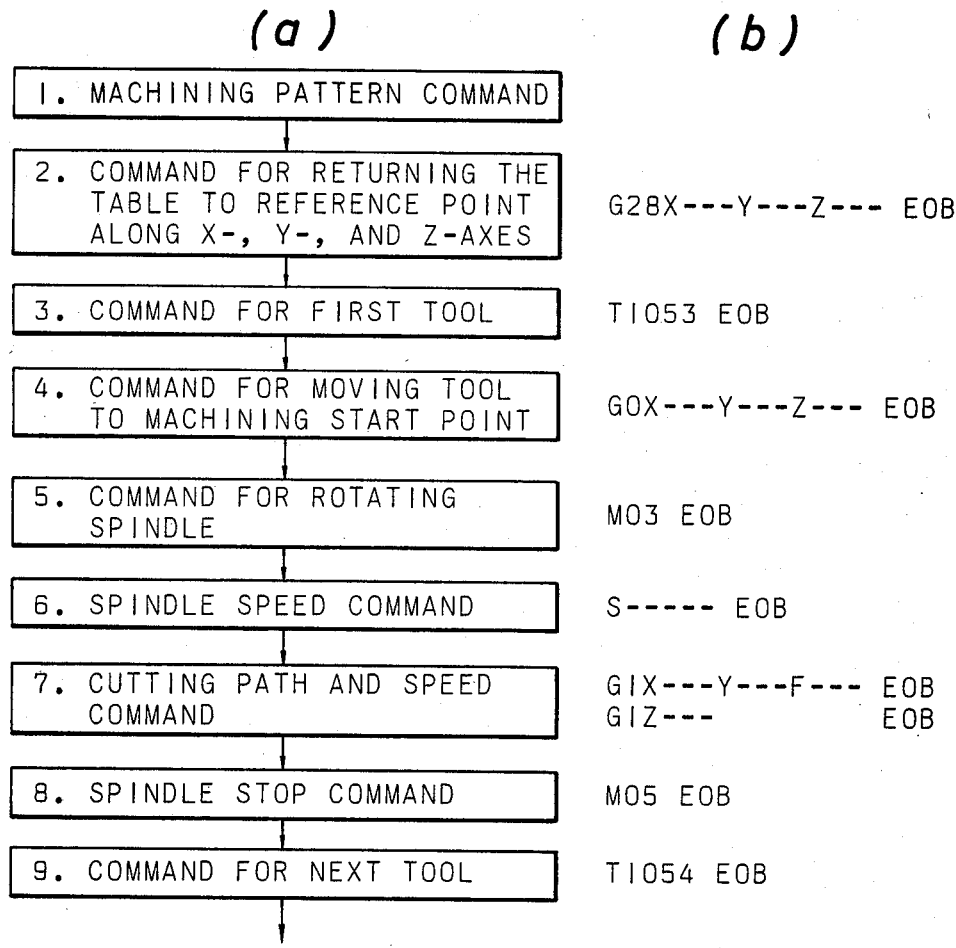
FIGS. 5(a) and (b) are diagrams explanatory of the manner in which a machining program is created, FIG. 5(a) being a flowchart for the preparation of a machining program and FIG. 5(b) showing a prepared machining program by way of example.
Figure 6:
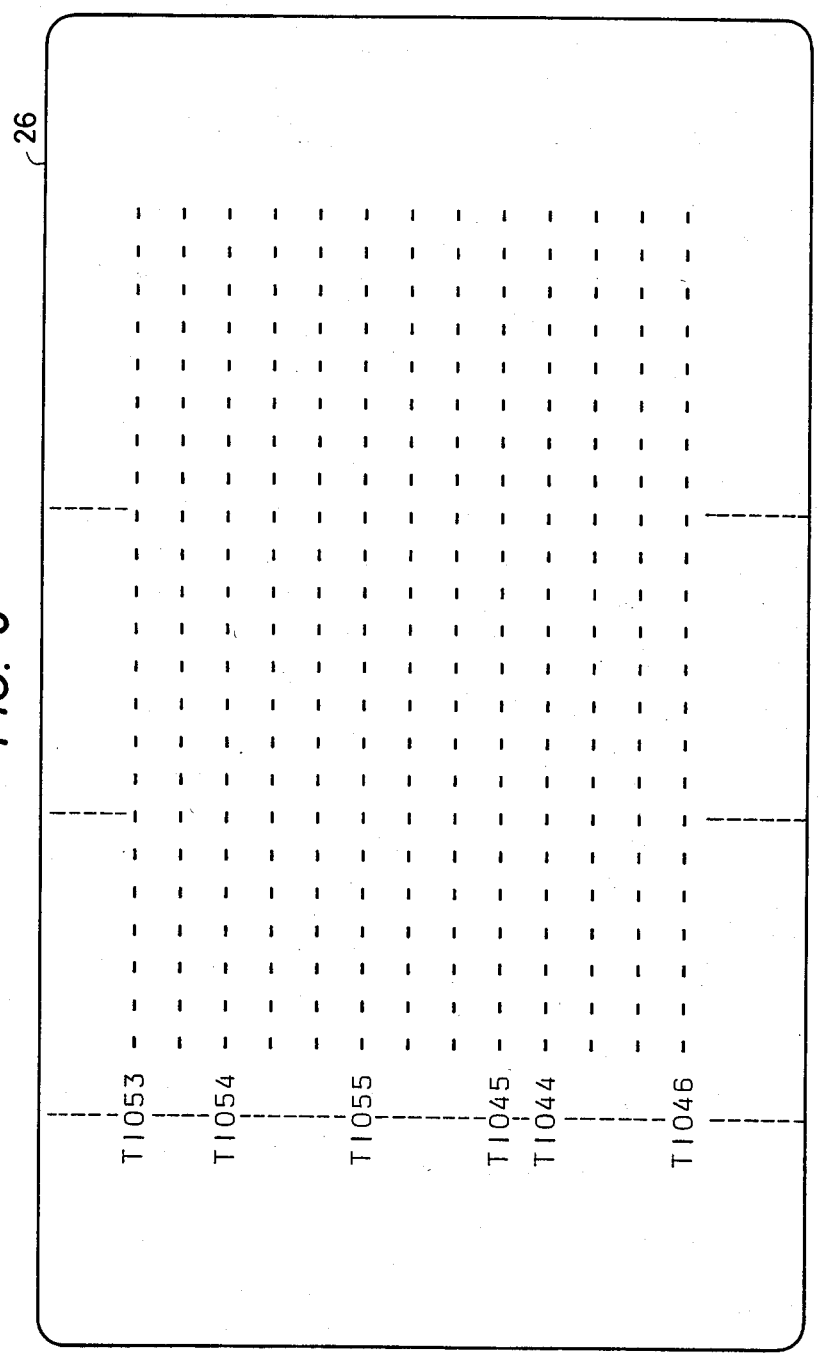
FIG. 6 is view of the screen of a conventional CRT, showing a displayed program.

In FIG. 8, a list of tools necessary for the machining program for forming the counterbore as shown in FIG. 2 is displayed on the screen of CRT 26. The displayed information includes the tools required by the machining program, but excludes numerals and symbols unnecessary for tool preparation. Therefore, the operator can easily locate the tools on the screen of the CRT 26.

Accordingly, the present invention makes it simple and easy for the operator to prepare the tools necessary for a particular machining program.

It is preferable that the tools be displayed in their machining order on the CRT 26 as illustrated in FIG. 8.

In FIG. 8, the CRT 12 additionally displays a list of various parameters of the selected tools. The displayed tool parameters include the "NOMINAL DIAMETER" of the tools, the "TOOL DIAMETER" and "LENGTH" of the tools, the "LENGTH COMPENSATION," and "TOOL LIFE," for instance. The term "LENGTH COMPENSATION" used herein means the amount of wear on the tool. The "TOOL DIAMETER" means the diameter of the tool, the "LENGTH" the distance between the tip end of a tool and the end face of a spindle on which the tool is mounted, and the "TOOL LIFE" is the period of time in which a tool can be used for a cutting operation.

In order to display the tool parameters on the CRT 26, it is necessary that they be stored in the memory 23. To this end, storage areas $a_1$, $a_2$, ... of equal size for the respective tools are reserved in the memory 23, each storage area being divided into regions for storing data on tool parameters, respectively, as shown in FIG. 9. The stored parameters can be displayed on the CRT 26. The parameter data items can be rewritten by new data items entered through a keyboard, for example.

Parameters such as the "NOMINAL DIAMETER" of the tools are displayed in the following manner: The nominal diameters of the tools (the tool name:"spot" has a nominal diameter of 12.0) are determined upon the creation of a machining program, and are displayed when the tools are displayed. More specifically, the nominal diameters are automatically determined by the NC unit when machining specifications are programmed. For example, when a drilled hole having a diameter of 10 mm is specified, the nominal diameter of a drill to be used is automatically determined as 10 mm. However, "TOOL DIAMETER," "LENGTH," "LENGTH COMPENSATION" and "TOOL LIFE" are not determined on the creation of a machining program. These parameters can be displayed by the operator who actuates numeral key switches (not shown). As shown in FIG. 8, these parameters are initially set to zero, and can have given values as shown in FIG. 10, for example, only when the numeral key switches are actuated by the operator. As an example, the "LENGTH" of an end mill is first displayed as "0.000," and can display "147.754" as shown in FIG. 10 when the operator touches numeral key switches "1", "4", "7", ".", "7", "5", "4" in the order named. The values can of course be changed as actual changes take place due to wear, etc.

The parameters "LENGTH" are also entered and displayed by the operator who measures the actual lengths of the tools and operates the numeral key switches accordingly. However, an automatic length setting process may be employed for automatically measuring and displaying the tool lengths.

Figure 11:
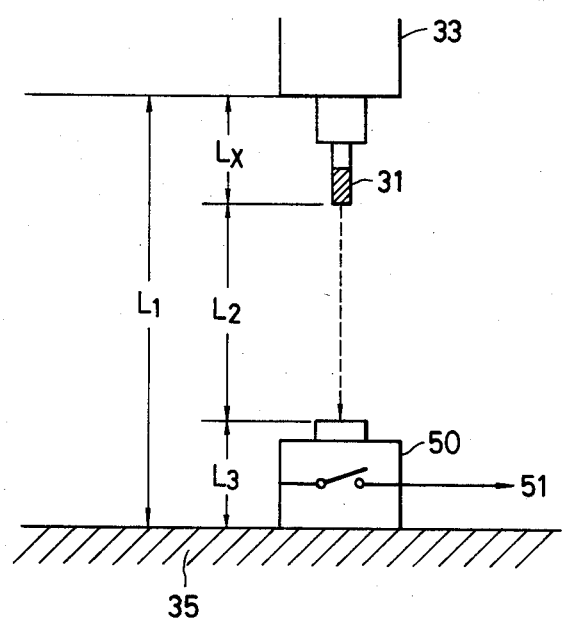
FIG. 11 is a diagram illustrative of an automatic tool length setting process.

Such an automatic length setting process will be described with reference to FIG. 11. First, a measurement base 50 having a height $L_3$ is placed on a table 35, and then a tool 31 mounted on a spindle 33 is lowered toward the measurement base 50 to measure the distance $L_2$ which the tool 31 has traversed before a signal 51 is generated by the measurement base 50, the signal 51 being indicative of contact between the tool 31 and the measurement base 50. The end face of the spindle 33 is spaced upwardly from the table 35 by a distance $L_1$ which is known in advance. From these known and measured distances $L_1$, $L_2$ and $L_3$, the length Lx of the tool can be found, and the length Lx thus determined is stored in a given memory area. This length setting process can be stored as a control program in the memory 23 in the NC unit.

With the NC machining system according to the present invention, a list of tools with the tool parameters as required for a machining program created is displayed on the display device, and the operator can easily locate the tools on the display and prepare the desired tools.

Although a certain preferred embodiment has been shown and described, it should be understood that many changes and modifications may be made therein without departing from the scope of the appended claims.

What is claimed is:

1. A numerically controlled machining system comprising:
   a numerical control unit for controlling a machine tool, said numerical control unit including an input device, an arithmetic unit for effecting arithmetic operations on commands entered through said input device, a memory for storing the commands from said input device and the results of the arithmetic operations of said arithmetic unit, and a control unit for controlling the arithmetic operations in said arithmetic unit;
   means for storing in said memory a machining program having machining pattern commands for specifying machining patterns, tool commands for specifying tools, tool parameters and positional information commands for specifying positional information for the tools, wherein said tool parameters include nominal tool diameters, tool diameters, tool lengths, length compensations indicative of the amounts of wear on the tools, and tool lives, wherein the term "length compensation" used herein means the amount of wear on the tool, the term "tool diameter" means the diameter of the tool, the term "tool length" means the distance between the tip end of a tool and the end face of a spindle on which the tool is mounted, and the term "tool life" is the period of time in which a tool can be used for a cutting operation;
   means for selecting only the tool commands and associated specified tools from the stored machining program;

means for displaying tool parameters selected by said selecting means, wherein said displaying means displays a list of the selected tools in their machining order in the stored machining program; and automatic length setting means for measuring the length of each tool.

2. A numerically controlled machining system according to claim 1, including a keyboard for rewriting tool parameters.

3. A numerically controlled machining system according to claim 1, wherein said numerical control unit includes means for manually inputting the machining program.

4. A numerically controlled machining system according to claim 3, wherein said inputting means includes a keyboard for entering, deleting, inserting and correcting data items for the machining program which is being displayed by said displaying means.

* * * * *